United States Patent [19]
Depenthal et al.

[11] 3,782,332
[45] Jan. 1, 1974

[54] AUTOMATIC FEEDING DEVICE

[76] Inventors: Fritz Depenthal, 6506 W. 66th St., Overland Park; Karl M. Swartz, 6034 Windsor Dr., Shawnee Mission, both of Kans. 66202

[22] Filed: Sept. 18, 1972

[21] Appl. No.: 290,011

[52] U.S. Cl. ........... 119/51.13, 119/51.14, 119/51.5, 119/78
[51] Int. Cl. .............................................. A01k 5/02
[58] Field of Search ........................ 119/51.5, 51.13, 119/51.14, 78; 220/70

[56] References Cited
UNITED STATES PATENTS

| | | | |
|---|---|---|---|
| 3,171,385 | 3/1965 | Decker et al. | 119/51.5 X |
| 3,658,036 | 4/1972 | Caracappa | 119/51.13 |
| 2,719,509 | 10/1955 | Kitson | 119/78 X |
| 3,683,859 | 8/1972 | Kirk | 119/51.13 |

Primary Examiner—Louis G. Mancene
Assistant Examiner—J. N. Eskovitz
Attorney—Claude A. Fishburn et al.

[57] ABSTRACT

A feeding device for the automatic feeding and watering of cats, dogs and the like. The feeding device includes a food container having a plurality of individual food storage compartments mounted on a delivery chute for delivering food from each compartment to a feeding pan upon selectively opening of closure members normally closing the respective compartments. The feeding device also includes a watering device comprising a water storage container and a valve operably connected to the water storage container and a watering pan for supplying water from the container to the watering pan on demand.

8 Claims, 6 Drawing Figures

PATENTED JAN 1 1974 3,782,332

PATENTED JAN 1 1974  3,782,332

AUTOMATIC FEEDING DEVICE

The principal objects of the present invention are: to provide a feeding device for pets and the like which automatically and at regular feeding times dispenses selected or normally required amount of food; to provide such a feeding device with a multiple compartment food storage bin and means to selectively open each compartment at selected intervals of time to dispense the food therein; to provide such a feeder with a timing device operable to open storage chambers at selected intervals for the unattended dispensing of the food; to provide such a feeder with a delivery chute that has no moving parts providing positive and virtually fool proof gravity flow for the distribution of feed to a bowl or pan; to provide such a feeder with a bowl or pan for water and a supply to maintain the level therein; to provide such a feeder with a water storage container that will hold a sufficient quantity of water to supply an animal's needs for several days; to provide such a feeder with a float valve to let water into the bowl from the storage container to replenish the water consumed; to provide such a feeder with means to connect the float valve directly to a water flow source to eliminate the need for filling the water storage container; and to provide such a feeder that is compact, has a minimum of parts, is portable and that is easy and inexpensive to manufacture and maintain.

Other objects and advantages of this invention will become apparent from the following description taken in connection with the accompanying drawings wherein are set forth by way of illustration and example certain embodiments of the present invention.

Figure 1:
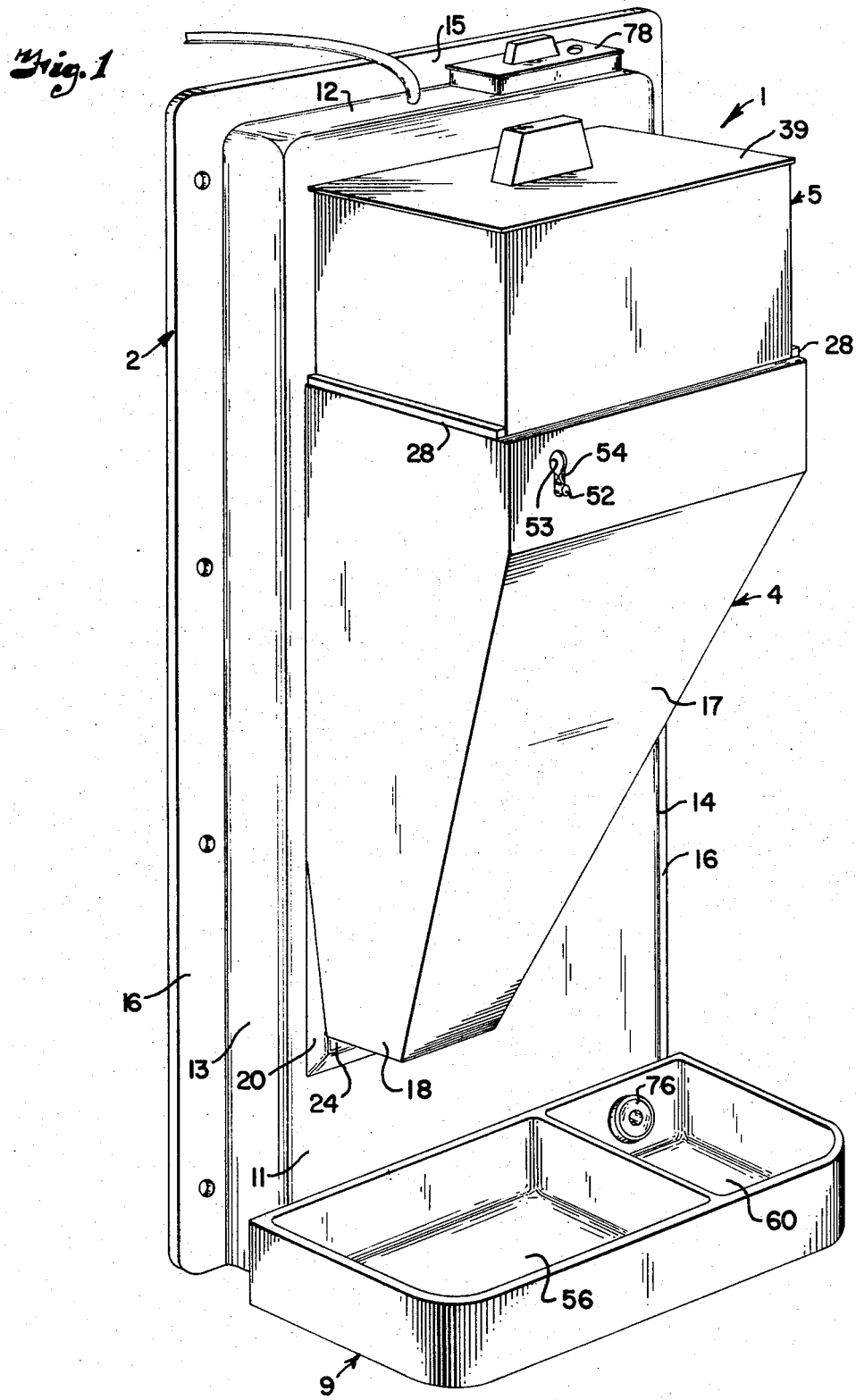
FIG. 1 is a perspective view of the feeding device.
Figure 2:
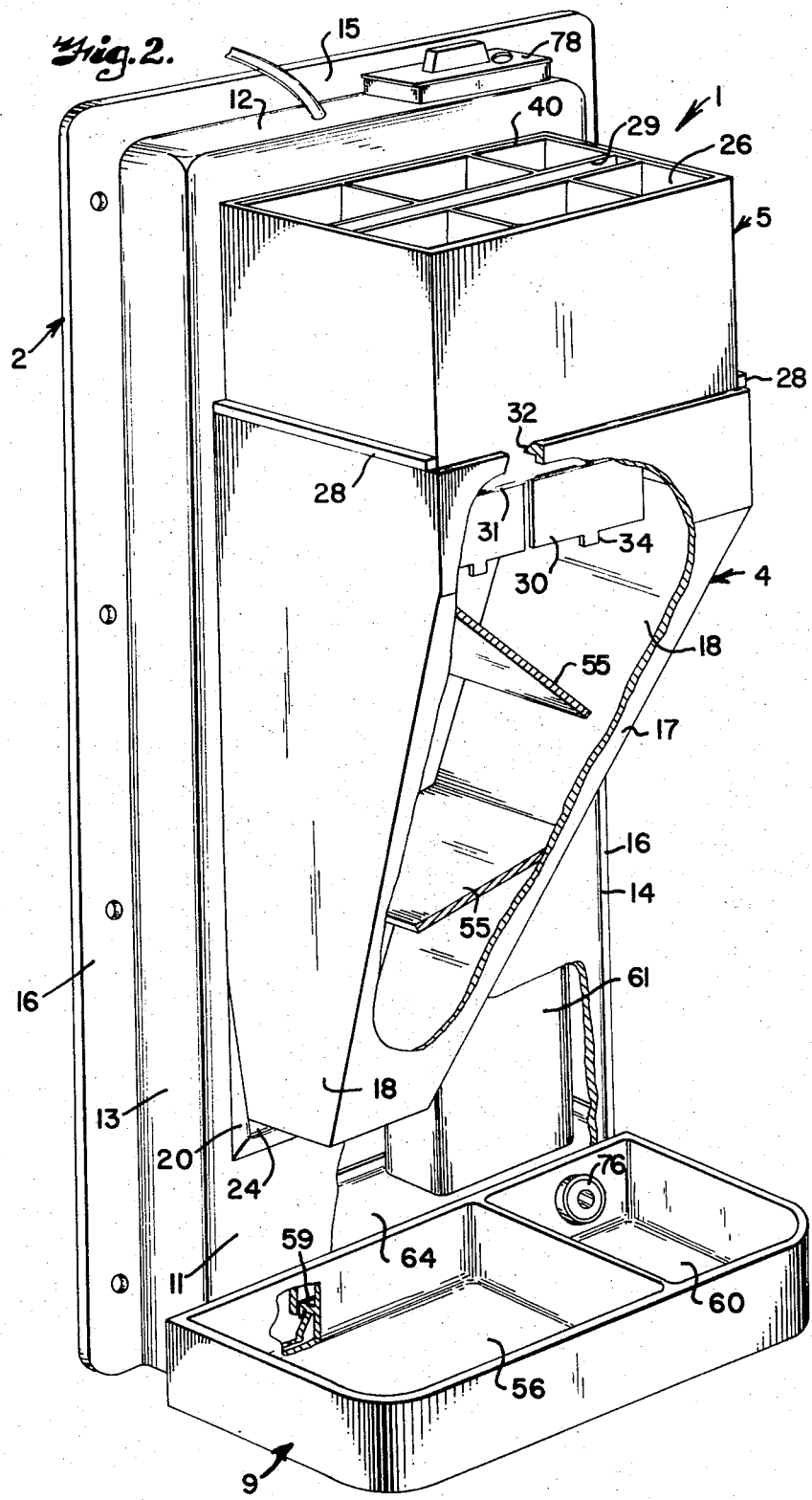
FIG. 2 is a sectioned perspective view of the feeding device.
Figure 3:
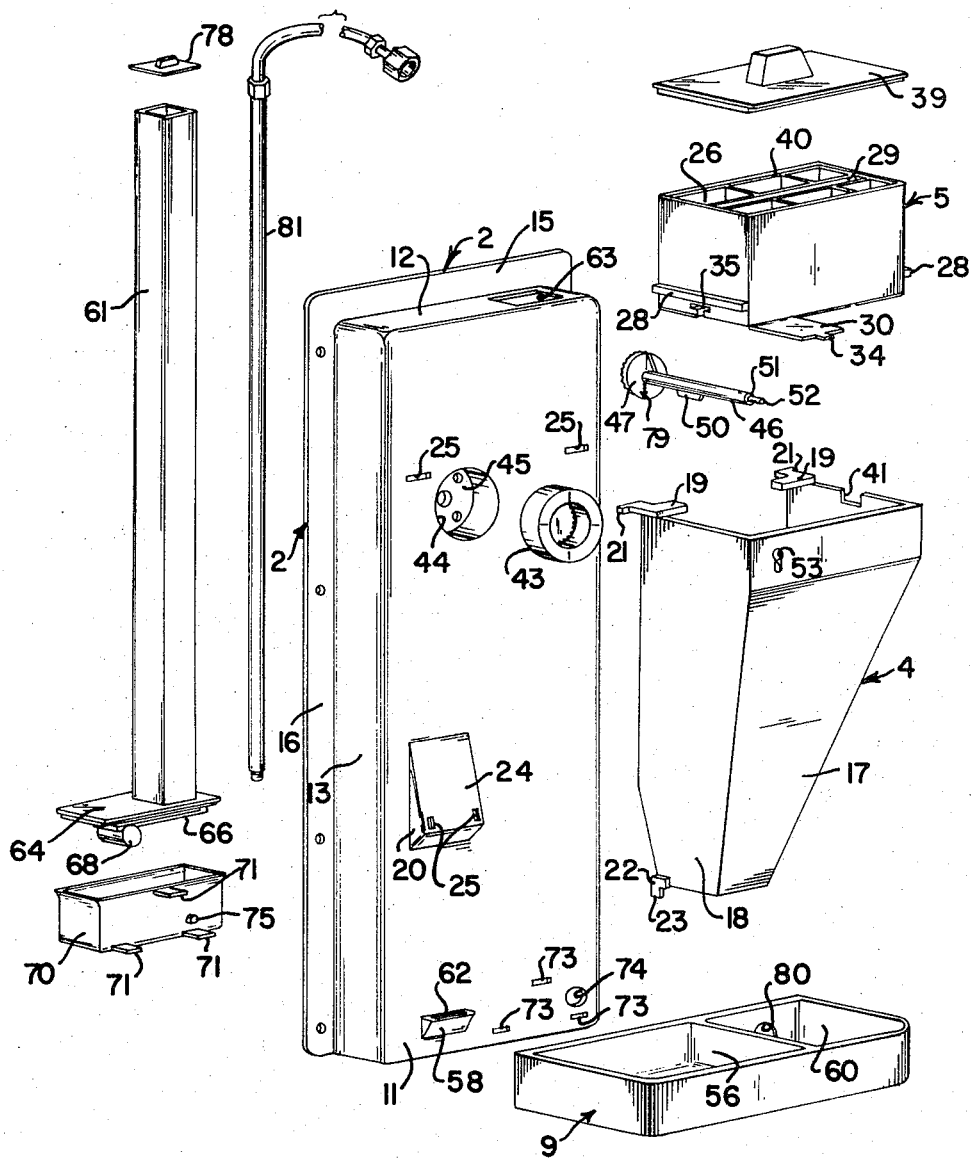
FIG. 3 is an exploded perspective view of the feeding device.
Figure 4:
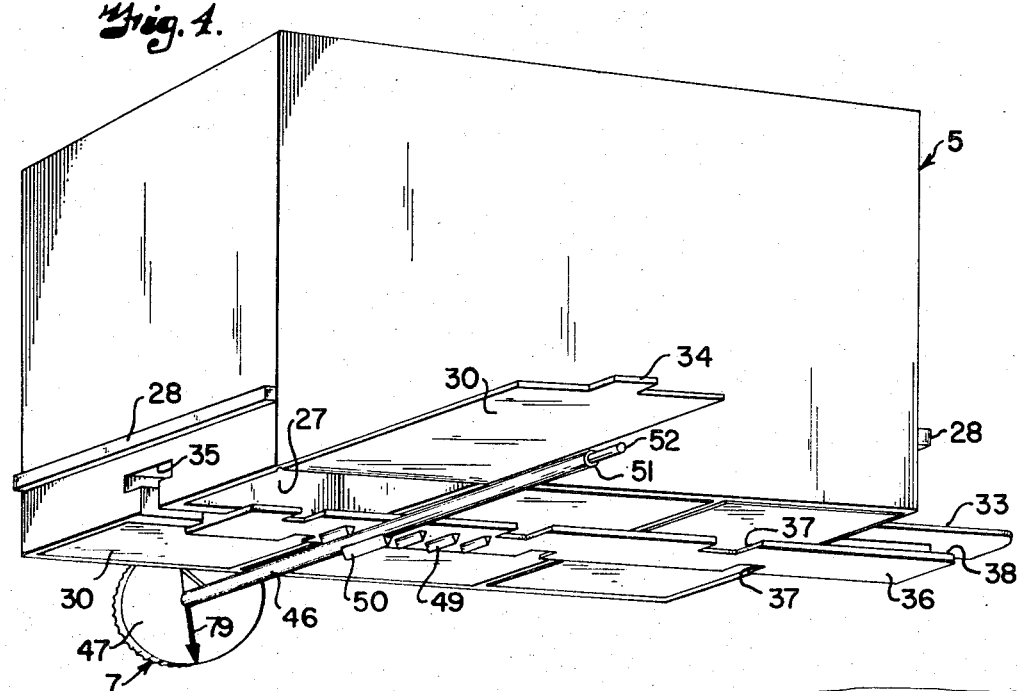
FIG. 4 is a perspective view showing the food storage bin, slide member and timer actuating means.
Figure 5:
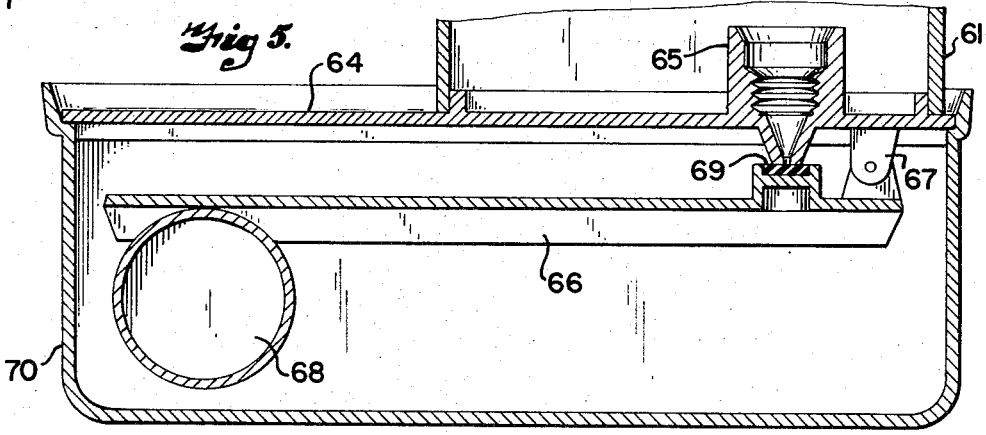
FIG. 5 is an enlarged sectioned view of the watering means showing details of the valve means.
Figure 6:
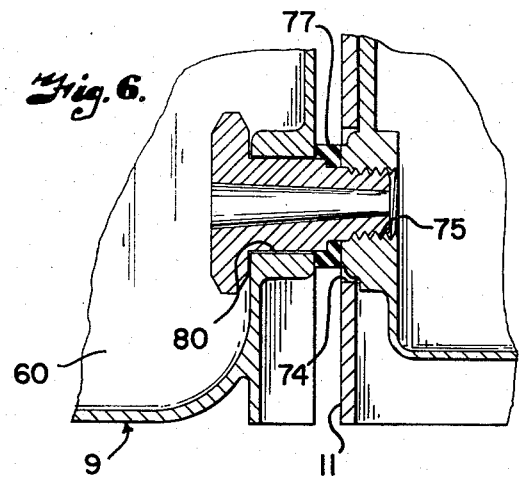
FIG. 6 is an enlarged side section view showing details of the watering means.

Referring more in detail to the drawings:

As required, detailed embodiments of the invention are disclosed herein, however, it is to be understood that these embodiments are merely exemplary of the invention, which may be embodied in many forms that are different from the illustrative embodiments presented herewith. Therefore, specific structural and functional details disclosed herein are not to be interpreted as limiting, but merely as a basis for the claims actually defining the scope of this invention.

The reference numeral 1 designates generally a feeding device or feeder for the automatic feeding and watering of cats, dogs and the like. The feeder 1 includes a mounting member or bracket 2 having a dispensing means 4 suitably supported thereon with a food storage bin or hopper 5 associated with the dispensing means. Timer actuating means 7 are operable to release feed from the bin 5 at timed intervals allowing the feed to be delivered through the dispensing means 4 to a feed receiving receptacle positioned below the dispensing means 4. Water storage means are associated with the mounting member 2 and are operably connected to a water receiving receptacle to maintain a water level therein. The feed and water receiving receptacles are portions of a pan 9.

The mounting member 2 is adapted for mounting on a suitable support structure such as a wall or the like suitable to hold said member 2 in a generally upright position. The mounting member 2 is a form of base housing and as illustrated has a front wall 11 generally rectangular in shape, an upper or top wall 12 and side walls 13 and 14 extending from the front wall 11 and terminating in outwardly extending top and side flanges 15 and 16 respectively. In the structure shown, the mounting member 2 is a pan like structure with an open back and bottom and the flanges 15 and 16 have a plurality of apertures for receiving securing devices (not shown) such as screws to secure the mounting member 2 to a suitable support structure such as a wall. In the illustrated structure, the mounting member has various portions and operations for cooperating with other portions of the feeder and assembly thereof as later described.

The feed delivery means 4 preferably is comprised of a front wall 17 and side walls 18 forming a three sided chute having an open back and is suitably supported by the mounting member 2. In the illustrated structure, the chute 4 is removably mounted on the mounting member 2 and is supported thereby. Engaging lugs 19 are integral with side walls 18 adjacent to the upper edge of the chute 4 and are on the rear most edge of the respective wall 18, each lug 19 having an ear 21 extending therefrom in opposed relation. Engaging lugs 22 are integral with the rear most edges of the respective side walls 18 and are positioned adjacent to the lower edges of the side wall 18, each lug 22 having an ear 23 extending downwardly therefrom. The lugs 19 and 22 are inserted into their respective apertures 25 that are through the front wall 11. The ears 21 and 23 extend through the apertures 25 and engage the back side of the front wall 11, thereby removably securing the chute 4 to the mounting member 2. When the chute 4 is secured to the mounting member 2, the front wall 11 forms the back side or wall of the chute 4. The rear most edge of each side wall 18 has a tapered portion adjacent the lower end of the chute 4 that corresponds to a raised portion 20 that has a tapered surface 24 engaging same when mounted. Preferably, the front wall 17 and one side wall 18 slope inwardly and converge downwardly to a lower edge of the walls 17 and 18 forming an outlet opening that is smaller than an inlet opening defined by the upper edges of the wall 17 and 18. The front wall 17 and the sloping side wall 18 each having generally upright portions extending downwardly from the upper edges thereof providing clearance for portions of the food storage bin 5.

The food storage bin 5 in the illustrated structure includes a plurality of food storage containers 26 that each have a discharge opening 27 positioned such that they are adjacent to the inlet of the chute 4 for discharge of feed therein. Preferably the food storage bin 5 is a generally rectangular box sized so as to fit in the inlet opening of the chute 4 and be appropriately supported thereby. One method of supporting the bin 5 would be to have integral ribs 28 on opposite end walls of the bin 5 that are adapted to engage and be supported by the upper edges of the side walls 18. The food storage containers 26 in the illustrated structure are rectangularly shaped and are positioned in two adjacent rows on opposite sides of the center partition 29 that extends the length of the bin 5. The food storage containers 26 are sized large enough to hold enough feed for one feeding and are of a sufficient quantity, as for example 6, to allow long periods of unattended feeding. A plurality of closure members or doors 30 are hingedly secured to the bin 5 as at 31 whereby each door 30 is positioned adjacent to the discharge opening 27 of a respective food storage container 26 normally closing same. The hinges 31 preferably are integral with both the respective door 30 and the side wall of the bin 5 and can be formed when the bin 5 and the door 30 are molded as a single unit, the hinges 31 being thin portions of flexible material between same. Preferably the bin 5 is mounted on the chute 4, whereby a rib 32 and the upright portions of the walls 17 and 18 of the chute 4 provides spacing for the doors 30 adjacent thereto to allow same to swing open without interference.

The feeder 1 is provided with means that selectively hold the doors 30 in a closed position for maintaining the feed in the food storage containers 26. Numerous devices can be used for this purposes and one device is shown in the illustrated structure wherein a slide member or bar 33 is slidably mounted on the bin and selectively supports the doors 30 by engaging a lug or abutment member 34 secured to each door 30. Timing means 7 are associated with the bar 33 and are operable to move same from supporting relation of the lugs 34 to allow the doors 30 to sequentially open. The bar 33 can be one of various configurations so long as movement thereof sequentially moves same from supporting relation of the doors 30. Preferably the bar 33 is I-shaped and is mounted in and is supported by shoulders of a T-shaped slot 35 that opens downwardly and extends the length of the bin 5 and is positioned under the center partition 29. When the bin 5 is mounted on the chute 4 an open end of the T-shaped slot 35 corresponds to a notch 41 that extends through a side wall 18 of the chute 4. A lower flange 36 of the bar 33 extends below the bottom of the bin 5 and has a plurality of spaced apart lug receiving slots or openings 37 therethrough that are positioned along both side edges of the flange 36 such that an increment of movement of the bar 33 will move a respective slot 37 to a position of registry with a respective lug 34. The lugs 34 each can then sequentially move through a respective slot 37 and by moving the bar 33 further the lugs 34 engage an upper surface or member 38 of the flange 36 and are supported thereby holding the doors 30 in a closed position. With the bin 5 mounted on the chute 4, incremental movement of the bar 33 is effected by the timing means 7 sequentially allows each door 30 to hinge downwardly and open the food container 26 to discharge the feed into the chute 4. The notch 41 provides an opening for the bar 33 to move through so that it can move beyond the edge of the bin 5 without interferring with the chute 4. It is desirable to provide the food storage bin 5 with a suitable cover 39 to seal the upper open end thereof from the entry of water or other foreign matter. In the illustrated structure, the cover 39 is supported by a ridge 40 adajcent to the top of the food storage bin 5 and positioned around the inside periphery thereof.

The timing means 7 includes a timer 43 operably associated with the bar 33 for incrementally moving same at preselected time intervals. Preferably the timer 43 is electrically powered and in operation makes one revolution per 24 hours. In the illustrated structure, the timer 43 is suitably mounted in a recess 44 on a back surface 45 thereof and an elongate member or bar 46 has a disc portion 47 secured to one end thereof, the disc portion 47 having serrations corresponding to serrations on an exposed face of the timer 43 so as to be engageable therewith. With these serrations engaged the timer 43 can rotate the member 46. The bar 33 has a lower surface 48 that has a plurality of shoulder forming portions 49 such as teeth that extend downwardly therefrom and are operable to engage a member or tooth 50, secured to the member 46, in response to timer 43 and member 46 rotation. The tooth 50 extends from the member 46 generally normal to the longitudinal axis thereof and is positioned along the member 46 so as to sequentially engage the shoulder forming portions 49 with the bin 5 mounted on the chute 4 as previously described. The end of the member 46 opposite the disc portion 47 is rotatably mounted on the chute 4 such as by having a pin or projection 52 secured thereto and extending therefrom and into an aperture 53, the pin 52 being smaller in cross section than the member 46 so as to form a shoulder 51. The aperture 53 preferably is comprised of a large portion with a slot extending therefrom. The enlarged portion is larger in cross section than the member 46 and the slot has a width smaller than the cross section of the member 46 and larger than the pin 52. The pin 52 extends through the slot whereby the shoulder 51 engages the back side of the wall 17 thereby holding the serrations in engagement. In order to disengage the serrations, the pin 52 if forceably moved between two projections 54 that extend into the slot to secure the pin 52 therein. This movement registers the member 46 with the enlarged portion whereby the member 46 can be moved therethrough thereby disengaging the serrations allowing changing of the desired feeding time.

Rotation of the member 46 by the timer 43 moves the tooth 50 into engagement with a shoulder forming portion 49 effecting incremental movement of the bar 33 and each subsequent rotation of the member 46 effects subsequent incremental movement of the bar 33. Each incremental movement of the bar 33 moves a slot 37 in registry with a lug 34 so that the lug 34 may move through the respective slot 37 allowing the respective door 30 to swing downwardly and release the feed contained in the food storage container 26 as previously described. Means are provided to slow the rate or velocity of the falling feed through the chute 4 such as baffle members 55 appropriately secured in the interior of the chute 4. Preferably, the baffles 55 are staggered along the length of the chute 4 and have overlapped free ends and opposed downward slopes whereby when the feed is discharged from a container 26 it slides down the upper baffle 55 onto the lower baffle 55 and out the outlet of the chute 4.

The pan 9 is suitably mounted on and supported by the mounting member 2 and has a feed receiving receptacle 56 at one end thereof positioned under the outlet of the chute 4. The feed receiving receptacle 56 is spaced from the outlet a sufficient distance so as to prevent the chute 4 from interferring with access to the feed receiving receptacle 56 by a pet. When the pan 9 is mounted on the mounting member 2, a shoulder is formed therebetween. The raised portion 20 and the sloping walls 17 and 18 of the chute 4 deflect the falling feed outwardly of this shoulder and into the feed receiving receptacle 56 to assure that all the feed falls therein to minimize spillage. Preferably, the front wall 11 has a second raised portion 58 that slopes outwardly and upwardly and has a through slot 62 positioned at the upper end thereof between the raised portion 58 and the front wall 11. The pan 9 has a mounting lug 59 on the back side thereof and in the illustrated embodiment the pan 9 is mounted on the mounting member 2, by inserting the lug 59 into the slot securing the pan 9 thereto. A shoulder may be provided on the lug 59 to more securely mount the pan 9 on the mounting member 2.

The water storage means are suitably supported by the mounting member 2 and are operable to control the water level in a water receiving receptacle 60 associated therewith. Although the water storage means can be mounted on the mounting member in several positions, the illustrated structure shows it as being mounted on the back side of the front wall 11.

Preferably, the water receiving receptacle 60 is at the opposite end of the pan 9 from the feed receiving receptacle 56 or it can also be a seperate unit secured to the mounting member 2. As illustrated, the water storage means includes a water storage receptacle and valve means communicating therewith and with said water receiving receptacle 60 controlling the water level in the water receiving receptacle 60 in response to a decrease in the water level. The water storage receptacle is comprised of an elongate rectangular tube 61 extending downwardly through a rectangular hole 63, the lower end thereof being suitably secured in sealed relation to a float valve container cover 64, a portion of which forms a bottom for the tube 61. The valve means preferably is a float valve that includes a hollow seat member 65 that is integral with the cover 64 and has an upper portion of the interior thereof threaded and has a lower portion of the seat member 65 extending downwardly from the cover 64 and has downwardly converging inner and outer surfaces forming a reduced size outlet. A valve arm 66 is pivotally secured to mounting members 67 that are integral with the lower surface of the cover 64. In the example illustrated, the valve arm 66 is provided with a float member 68 secured thereto adjacent the end opposite the pivotally mounted end, the float member 68 being adapted to float in water. The arm 66 includes a resilient seal member 63 suitably secured thereto and positioned along the arm 66 so as to engage the outlet of the seat member 65 for selectively sealing same in response to the water level in the water receiving receptacle 60 reaching a predetermined level. The tube 61, cover 64 and valve arm 66 are mounted on a float valve container 70 that forms an enclosed compartment with the valve arm 66 enclosed therein. Preferably the container 70 has a ridge extending around the inner periphery adjacent to the open end thereof whereby the cover 64 engages same and is supported thereby.

In the illustrated embodiment, the container 70 has integral mounting members 71 extending from one side thereof and are received through slots 73 that extend through the wall 11 to provide mounting support for the container 70 which in turn provides support for the tube 61 and the cover 64 mounted on the container 70.

With the mounting members 71 inserted into the slots 73 the container 70 has a round projection on one wall thereof extending into an aperture 74 that is through the front wall 11. The round projection has a threaded hole 75 extending therethrough and is in aligned relation with the aperture 74 and an aperture 80 that extends through the back wall of the water receiving receptacle 60. A hollow connector 76 threadably engages the hole 75 and extends through the apertures 80 and 74 having a head portion engaging the interior surface of the water receiving receptacle 60. When the connector 76 is tightened, the float valve container 70 is urged into engagement with the back surface of the front wall 11 and secures the mounting members 71 in their respective slots 73. Preferably a seal member 77 is mounted on the hollow connector 76 and is positioned between the back side of the pan 9 and the round projection on the container 70 sealably engaging same to provide a leak proof connection therebetween. The hollow connector 76 provides a conduit for water flow from the container 70 to the water receiving receptacle 60. The water storage receptacle is sized to hold enough water for a pet for several days supply.

Although enough water may be stored in the water storage receptacle to supply a pet's needs for several days, it may be desired to provide the watering means with means to directly connect same to a pressurized water system such as the household water system rather than fill the tube 61 with water by hand. A tubular member 81 has one end threaded and threadably engages the threaded portion of the hollow member 65, the other end of the tubular member 81 has a coupling suitable for connecting the tubular member 81 to the pressurized water system. A cover 78 is adapted to be mounted in the opening of the rectangular tube 61 and has an aperture therethrough providing an access opening for the tubular member 81 to extend through. The cover 78 seals the tube 61 from the entry of undesirable foreign matter.

In operation, the doors 30 are closed and the bar 33 is moved to hold the doors 30 in the closed position as described above. The desired number of food storage containers 26 are filled with suitable dry or semi-dry feed in the sequence that the doors 30 open on incremental movement of the bar 33. Before mounting the food storage bin 5 on the chute 4, the timer is set at the desired feeding time by disengaging the serrations as previously discussed and moving an indicator 79 to the number of hours that it is desired to slapse before the first feeding time and then the bar 46 is locked into position to maintain engagement between the serrations. The indicator 79 is scribed or marked on the surface of the disc portion 47 and points radially in the same direction as the tooth 50 to indicate its rotative position. The food storage bin 5 is then appropriately mounted on the chute 4 and the cover 39 is installed to prevent water or other matter from entering the food container 26. The tube 61 is filled with water or the float valve is connected to a pressurized water system and the cover 78 is installed thereon. Water flows from the tube 61 through the hollow seat member 65 into the container 70 and the water receiving receptacle 60 until a predetermined level is reached, whereby the float causes the seal member 69 to move upwardly and engage the seat member 65 thereby sealing the outlet and shutting off the water flow. Water flow remains shut off until the water level in the water receiving receptacle 60 and container 70 becomes low enough to allow the seal member 69 to disengage the seat member 65 thereby allowing the water to flow again until the water reaches the predetermined level. When the time set on the timer 43 has elasped, the tooth 50 engages the first shoulder forming portion 49 moving the bar 33 to a position at which a lug 46 registers with its respective lug receiving slot 37 and moves therethrough allowing the door 30 to swing open thereby releasing the feed in the respective food storage container 26. The feed therein falls through the chute 4 over the baffles 55 as previously described and out the chute outlet into the feed receiving receptacle. Each subsequent revolution of the timer 43 will incrementally move the bar to another position whereby a subsequent lug 34 registers with its respective slot 37 permitting its respective door 30 to open and release the feed therein. The feeding process repeats itself until all containers 26 are empty thereby allowing a person to feed his pet daily even though he is not present.

It is to be understood that while I have illustrated and described certain forms of my invention, it is not to be limited to the specific form or arrangement of parts herein shown.

What we claim and desire to secure by Letters Patent is:

1. A feeding device for pets comprising:
   a. a mounting member having an upper portion and a lower portion;
   b. a feed receiving receptacle positioned adjacent said mounting member lower portion;
   c. a food storage bin having a plurality of food storage containers, said containers each having a bottom discharge opening and being adapted to hold feed for one feeding period;
   d. closure members normally closing said discharge openings to retain feed in said containers;
   e. means associated with said closure members and operable for sequentically releasing same to discharge feed from a respective container;
   f. a chute supported on said mounting member upper portion and having means forming an upwardly open end, and
   g. means removably supporting said bin adjacent said chute open end with said discharge openings communicating into said chute, said chute receiving the feed from said containers and directing same to said feed receiving receptacle.

2. The structure as set forth in claim 1 wherein said sequentially releasing means includes:
   a. slide means operably associated with said bin having portions thereof in supporting engagement with said closure members, said slide means being movable from supporting engagement of said closure members whereby same are sequentially opened;
   b. timer means supported by said mounting member and having a portion thereof engageable with portions of said slide means and operable for moving same, said timer means and said bin being separable when removing said bin from said chute open end.

3. The structure as set forth in claim 1 wherein said feeding device includes:
   a. a water receiving receptacle supported by said mounting member adjacent said lower portion thereof;
   b. a water storage receptacle associated with said mounting member;
   c. a float valve communicating between said water receiving receptacle and said water storage receptacle and being operable in response to water level in said water receiving receptacle.

4. The structure device as set forth in claim 2 wherein:
   a. said closure members include doors;
   b. hinge members operably connected to said food storage bin and each supporting one of said doors adjacent the respective discharge opening whereby said doors are swingable downwardly from a closed position to an open position, each of said doors having an abutment portion spaced from a respective hinge member;
   c. said slide means including a slide member mounted on said bin adjacent said abutment portions whereby said slide member is movable linearly;
   d. said slide member having a plurality of engaging surfaces normally supporting said doors, said engaging surfaces being arranged relative to the selective abutment portions for engagement therewith and for moving from supporting relation therewith in response to a predetermined movement of said slide member, thereby allowing a respective door to swing to said open position.

5. The structure as set forth in claim 1 wherein said bin supporting means includes:
   a. upwardly facing edges on the upper open end of said chute; and
   b. rib member projecting outwardly from said bin, said ribs being operable to engage said chute upper edges for removably supporting said food storage bin on said chute.

6. The structure as set forth in claim 1 including:
   a. baffles secured in the interior of said chute and having spaced apart and overlapping edges and opposed downward slopes for deflecting the feed to slow the rate of fall through said chute.

7. The structure as set forth in claim 2 wherein:
   a. said slide means portions comprise spaced shoulders, and
   b. said timer means includes a timer and means operably associated with said timer and selectively engaging said shoulders for sequentially moving said slide means linearly in response to timer actuation.

8. The structure as set forth in claim 7 wherein:
   a. said means operably associated with said timer includes a rotating shaft and a shoulder supported by said shaft and rotating therewith.

* * * * *